Oct. 12, 1954  L. C. WOLLASTON  2,691,289
BICYCLE LOCK
Filed Oct. 20, 1950  2 Sheets-Sheet 1
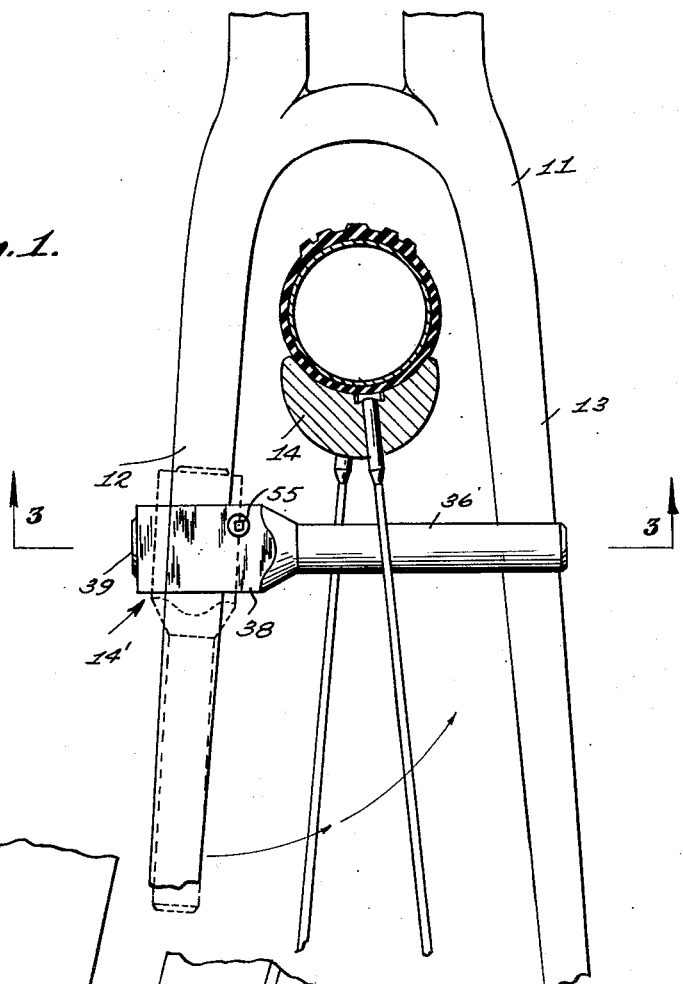
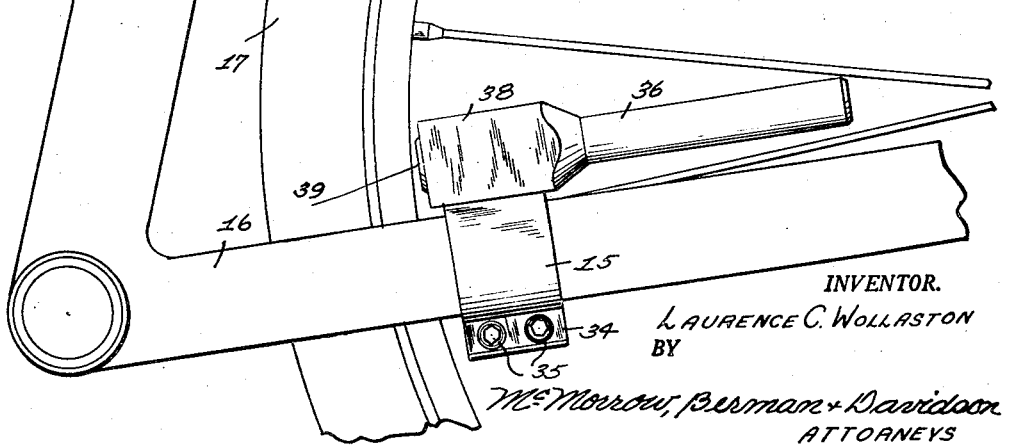
INVENTOR.
LAURENCE C. WOLLASTON
BY
McMorrow, Berman & Davidson
ATTORNEYS Oct. 12, 1954 — L. C. WOLLASTON — 2,691,289
BICYCLE LOCK
Filed Oct. 20, 1950 — 2 Sheets-Sheet 2
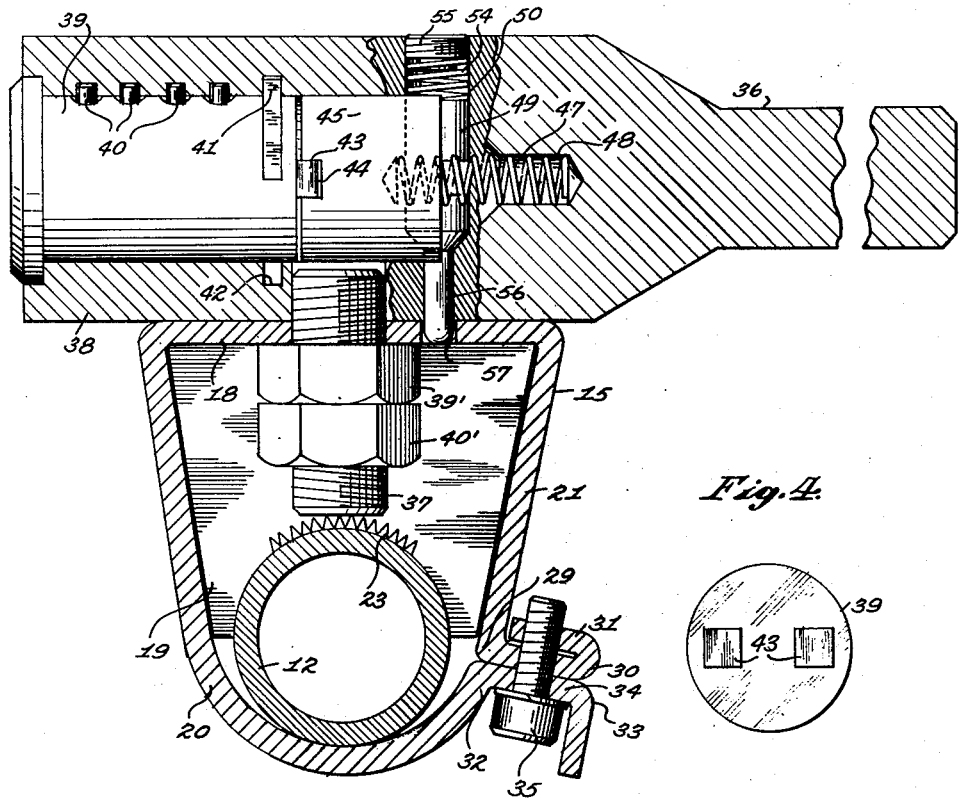
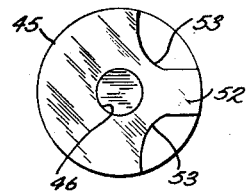
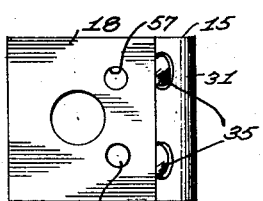
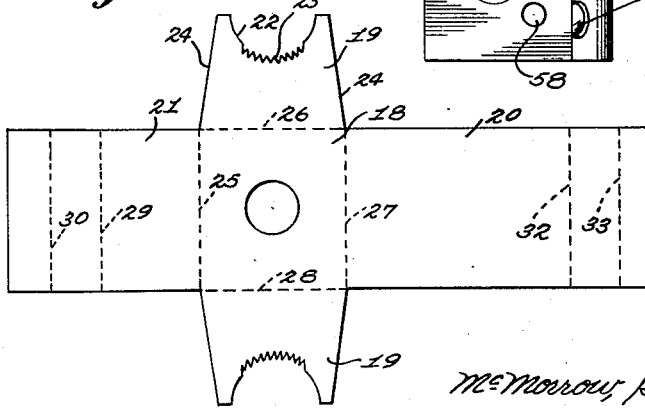
INVENTOR.
LAURENCE C. WOLLASTON
BY
McMorrow, Berman & Davidson
ATTORNEYS Patented Oct. 12, 1954

2,691,289

UNITED STATES PATENT OFFICE 2,691,289

BICYCLE LOCK

Laurence C. Wollaston, Hopewell, Va.

Application October 20, 1950, Serial No. 191,126

2 Claims. (Cl. 70—227)

This invention relates to bicycle locks, and more particularly to a bicycle lock which may be mounted on a leg portion of the frame of the bicycle, and which may be swung into a position extending through the front wheel of the bicycle, thereby preventing use of the bicycle by unauthorized persons.

A main object of the invention is to provide a novel and improved bicycle lock which may be permanently attached to the frame of a biclcle, said lock being simple in construction, being relatively easy to install on the bicycle, and being securely locked in an out-of-the-way position when its use is not required.

A further object of the invention is to provide an improved bicycle lock which may be readily mounted on the frame of a bicycle and which requires the use of a key for the release thereof, said lock being inexpensive to manufacture, involving only a few parts, being sturdy in construction, and being substantially tamper-proof.

Further objects and advantages of the invention will become apparent from the following description and claims, and from the accompanying drawings, wherein:

Figure 1 is a fragmentary, vertical, transverse, cross-sectional view taken through the frame portion of a bicycle adjacent the front wheel thereof, showing an improved lock according to the present invention mounted on one of the legs of the fork of the bicycle;

Figure 2 is a fragmentary side elevational view of a rear portion of the bicycle shown in Figure 1, showing the lock device mounted thereon, the lock device being shown in wheel-releasing position;

Figure 3 is an enlarged, cross-sectional, detail view taken on the line 3—3 of Figure 1;

Figure 4 is an end view of the lock cylinder employed in the lock device;

Figure 5 is an end view of the lock cam employed in the lock device;

Figure 6 is a top plan view of the mounting bracket for the lock device;

Figure 7 is a plan view of the metal blank employed to form the mounting bracket of Figure 6.

Referring to the drawings, and more particularly to Figures 1, 2 and 3, 11 designates a front fork portion of a conventional bicycle frame, said front fork portion having the usual depending legs 12 and 13. Designated at 14 is the front wheel of the bicycle which is received in the usual manner between the legs 12 and 13 of the fork 11. Designated generally at 14′ is the improved lock device of the present invention, said lock device comprising a mounting bracket 15 which may be secured on one of the legs 12 or 13 of the fork 11, as shown in Figure 1, or alternatively, may be secured on a rear frame portion 16 of the bicycle adjacent the rear wheel 17 thereof, as shown in Figure 2.

The mounting bracket 15 may be formed from a metal blank shown in Figure 7, which comprises a main body portion 18 having the side wings 19, 19 and the respective longitudinal extensions 20 and 21. The side wings 19, 19 are formed at their ends with the arcuate notches 22 having the serrations 23. As shown in Figure 7, the side edges of the wings 19 converge outwardly, as shown at 24, 24. In forming the bracket, the blank is bent respectively at the lines shown at 25, 26, 27 and 28, to define a hollow, downwardly tapering box structure, the longitudinal extension 21 being bent at the lines 29 and 30, to define the bead or flange 31, shown in Figure 3. The extension 20 is bent on the lines 32 and 33 to define the channel-shaped flange 34 shown in Figure 3. As shown in Figure 3, the extension 20 is arcuately bent. In mounting the bracket, it is engaged around the leg portion 12 of the bicycle frame or around any other suitable portion of the frame, for example, the frame portion 16 shown in Figure 2, the serrations 23 engaging the frame member and the extension 20 engaging the opposite outer surface of said frame member in the manner shown in Figure 3. A clamping bolt 35 extends through the bottom wall of the channel-shaped flange 34 and is threaded into the reversely bent flange 31, whereby the bracket will be securely clamped on the bicycle frame portion when the bolt 35 is tightened. Said bolt may be of the Allen-head type, as shown in Figure 3, the head thereof being cylindrical and received inside the channel-shaped flange 34 in a manner preventing the unfastening of the bolt except by the use of a suitable Allen wrench. As shown in Figure 2, a pair of bolts 35, 35 are preferably employed for clamping the bracket 15 on the bicycle frame portion. Designated at 36 is a detent rod which is pivotally secured to the main wall portion 18 of the mounting bracket by a stud 37 extending rotatably through the wall 18 and threadedly engaged with the end portion 38 of the detent rod and extending at right angles to the axis of said rod. Designated at 39′ and 40′ are respective nuts threaded on the stud 37 below the wall 18 and securing the stud to said wall while allowing the rod 36 to be rotated around the axis of said stud. As shown in Figure 3, the detent rod 36 is rotatable in a plane parallel to the frame portion 12 on which the mounting bracket 15 is secured. Said detent rod may be rotated to a position overlying and parallel to the frame portion 12, as shown in dotted view in Figure 1, or may be rotated to a position extending through the wheel of the bicycle between adjacent spokes thereof, as shown in full line view in Figure 1.

Rotatably mounted in the end portion 38 of the detent rod 36 is a conventional lock barrel 39 having the usual locking tumblers 40 and being operated by a suitable key. The barrel 39 is retained in the end portion 38 of the detent rod by a retainer ring 41 engaging in an annular groove 42 formed in the bore of the rod portion 38. The end of the barrel 39 is formed with the spaced lugs 43, 43 which are received in a transverse groove 44 formed in the end of a cylindrical cam member 45 rotatably positioned in the bore of portion 38. The inner end of the member 45 is formed with an axial recess 46 which receives one end of a coil spring 47, the other end of said coil spring being received in an axial recess 48 formed in the end of the bore in rod portion 38. The spring 47 biases the cam member 45 toward the lock barrel 39 and maintains said cam member in coupling engagement with said barrel.

Designated at 49 is a locking pin which is slidably positioned in a transverse bore 50 formed in the rod portion 38 and located adjacent the cam 45. The pin 49 is formed with a transverse groove which receives a rib element 52 defined on the rear portion of the cam 45 between a pair of flutes or recesses 53 formed in the rear end portion of said cam. The pin 49 is biased downwardly, as viewed in Figure 3, by a spring 54 positioned between the top end of the pin 49 and a threaded cap member 55 engaged in the bore 50. The opposite end of the pin 49 is formed with the reduced bolt portion 56 which is biased outwardly by the spring 54 and which may be retracted against the biasing action of said spring by rotating the cam 45 by the use of a proper key in the lock barrel 39.

As shown in Figure 6, the main wall portion 18 of the bracket 15 is formed with a first socket element comprising an opening 57 adapted to receive the bolt portion 56 when the detent rod 36 is swung to its locking position, shown in Figure 1, and is formed with a second socket element comprising a recess 58 adapted to receive the bolt portion 56 when the detent rod 36 is swung to the inoperative position thereof shown in dotted view in Figure 1, wherein said detent rod is parallel to the frame portion 12. However, in order to retract the pin 49 from the opening 57, it is necessary to operate the lock barrel 39 by the use of a proper key. Therefore, the detent rod 36 may be readily locked in locking position by swinging the rod to said position.

It will be apparent from the above description that the bicycle lock device may be readily mounted on any suitable frame portion of a bicycle adjacent the wheel of a bicycle, and that the lock device is substantially tamper-proof when thus mounted. It will be seen that the stud member 37 is protected against unfastening by being housed in the mounting bracket 15, and that the clamping bolts 35 cannot be unfastened except by the use of a special size of Allen wrench.

While a specific embodiment of an improved bicycle lock device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bicycle lock comprising a clamp member adapted to be secured to a portion of a bicycle frame adjacent a wheel of the bicycle and perpendicular to the axle of the wheel, said clamp member having an opening therethrough to receive said frame portion, a pivot on said clamp member, the axis of said pivot being at right angles to and intersecting the axis of said opening, a detent rod mounted on said pivot for swinging movement in a plane defined by the axle and said frame portion and arranged to be swung through said wheel between adjacent spokes thereof, said rod being formed with an elongated recess, said recess paralleling said pivot axis and spaced therefrom, a bolt member slidable in said recess, a socket element on said clamp member adapted to receive said bolt member when the detent rod is swung through said wheel, spring means biasing said bolt member toward said socket element, a further socket element on said clamp member arranged to receive said bolt member when the detent rod is swung to a position parallel to said frame portion, a key operated lock barrel mounted in said detent rod and rotatable about an axis at right angles to the axis of said pivot, and means operable by said lock barrel for actuating said bolt member.

2. A bicycle lock comprising a clamp member adapted to be secured to a portion of a bicycle frame adjacent a wheel of the bicycle and perpendicular to the axle of the wheel, said clamp member having an opening therethrough to receive said frame portion, a pivot on said clamp member, the axis of said pivot being at right angles to and intersecting the axis of said opening, a detent rod mounted on said pivot for swinging movement in a plane defined by the axle of the wheel and said frame portion and arranged to be swung through said wheel between adjacent spokes thereof, said rod being formed with an elongated recess, said recess paralleling said pivot axis and spaced therefrom, a bolt member slidable in said recess, a socket element on said clamp member adapted to receive said bolt member when the detent rod is swung through said wheel, spring means biasing said bolt member toward said socket element, a further socket element on said clamp member arranged to receive said bolt member when the detent rod is swung to a position parallel to said frame portion, a key operated lock barrel mounted in said detent rod and rotatable about an axis at right angles to the axis of said pivot, and cam means operated by said lock barrel and arranged to retract said bolt member from said clamp member responsive to rotation of said lock barrel.

References Cited in the file of this patent

UNITED STATES PATENTS

| Number | Name | Date |
| --- | --- | --- |
| 979,453 | Eggleston | Dec. 27, 1910 |
| 1,314,329 | Hill | Aug. 26, 1919 |
| 1,429,599 | Liebowitz et al. | Sept. 19, 1922 |